United States Patent [19]

Maisel

[11] Patent Number: 4,534,054

[45] Date of Patent: Aug. 6, 1985

[54] SIGNALING SYSTEM FOR FM TRANSMISSION SYSTEMS

[76] Inventor: Douglas A. Maisel, 2412 6th St., Berkeley, Calif. 94710

[21] Appl. No.: 504,267

[22] Filed: Jun. 14, 1983

Related U.S. Application Data

[63] Continuation-in-part of Ser. No. 211,307, Nov. 28, 1980, Pat. No. 4,388,493.

[51] Int. Cl.$^3$ .............................................. H04H 5/00
[52] U.S. Cl. ............................................ 381/4; 381/6; 381/14; 381/13
[58] Field of Search ..................... 381/3–14; 370/76

[56] References Cited

U.S. PATENT DOCUMENTS

| | | | |
|---|---|---|---|
| 3,061,783 | 10/1962 | Noller | 340/825.58 |
| 3,280,260 | 10/1966 | Boothroyd et al. | 179/1 GD |
| 3,845,391 | 10/1974 | Crosby | 455/39 |
| 3,943,293 | 3/1976 | Bailey | 179/1 G |
| 4,016,366 | 4/1977 | Kurata | 179/1 GD |
| 4,124,779 | 11/1978 | Berens et al. | 179/1 GS |
| 4,246,440 | 1/1981 | Van Der Heide et al. | 179/1 GD |
| 4,252,995 | 2/1981 | Schmidt et al. | 179/1 GD |
| 4,281,217 | 7/1981 | Dolby | 179/1 GN |
| 4,388,493 | 6/1983 | Maisel | 381/12 X |

Primary Examiner—Gene Z. Rubinson
Assistant Examiner—W. J. Brady
Attorney, Agent, or Firm—Fitch, Even, Tabin & Flannery

[57] ABSTRACT

A signaling system for FM transmission systems is disclosed that utilizes one or more so-called quadrature subcarriers for transmitting at least one data signal, including signaling tones, digital data, program material, or the like. The signal is modulated on outer edges of the quadrature channel so as to minimize crosstalk interference with the conventional FM stereo difference channel subcarrier and to place the signals in regions of low hearing acuity. Use of a quadrature subchannel also enables a signal to be modulated onto the quadrature subcarrier to provide the capability of modulating a noise compressed difference signal in a manner so as to minimize degrading crosstalk with the adjacent difference channel subcarrier. A receiving apparatus is disclosed for decoding the quadrature subcarrier data independently of standard FM stereo demodulation.

11 Claims, 7 Drawing Figures

SIGNALING SYSTEM FOR FM TRANSMISSION SYSTEMS

This application is a continuation-in-part of U.S. patent application Ser. No. 211,307, filed Nov. 28, 1980, now U.S. Pat. No. 4,388,493, issued June 14, 1983.

The present invention relates to a signaling system for FM transmission systems, and more particularly to a signaling system that utilizes one or more so-called quadrature subcarriers for transmitting signaling tones, data or program material. A specially-equipped receiver decodes the various data or program signals, while ordinary receivers exhibit no significant interference from these additional signals.

Under FCC regulations, all FM broadcasters offering stereophonic programming transmit FM stereo signals as FM multiplex signals formatted in a "sum-difference" matrixing scheme. This matrixing scheme produces a composite signal from which the original stereo audio program can be reconstructed in standard stereo receivers. This composite signal includes a main channel, comprising the monophonic sum of the left and right audio program channels (L+R channel), and a subchannel, comprising the difference of the left and right audio program channels (L−R channel). This difference channel essentially carries stereo separation data, that is, data indicating the degree to which the audio at a given frequency in one channel differs in amplitude and phase from the audio of the same frequency in the other channel. The main channel (L+R) is directly modulated onto the FM carrier, while the subchannel (L−R) is amplitude modulated on a 38 kHz suppressed subcarrier, and the resulting double-sideband suppressed carrier signal is thereafter used to frequency modulate the main carrier in the same manner that the L+R channel does.

To indicate to a receiver that FM multiplex stereo is being transmitted, a 19 kHz pilot tone, to which the suppressed subcarrier frequency is phase-locked, is used to frequency modulate the main carrier. The major function of this "pilot carrier" is to provide a means to reconstruct accurately the suppressed 38 kHz subcarrier in the receiver, which is necessary for stereo detection. This pilot tone modulates the main carrier at a level of approximately 9% of full modulation. To enable the 19 kHz pilot tone to be detected cleanly by the receiver, i.e., to protect it from high frequency components of the audio program and other interference, the L+R channel is rolled off sharply by audio band limiting filters at a frequency of about 15 kHz, and the band of frequencies surrounding the 38 kHz subcarrier is limited to be between 23 kHz and 53 kHz. The resultant band between 15 kHz and 23 kHz is called the guard band.

Various prior art methods of transmitting signals or programs in addition to the normal FM stereophonic program are known. Most suffer from problems relating to interference either with or from the main stereophonic program, or from difficulties in transmission, reception, or both.

For example, one or more additional frequency modulated subcarriers may be added in a conventional manner to the composite signal and used to transmit audio programs, or data in the form of a frequency-shift-keyed (FSK) signal. One such channel is the 67 kHz subsidiary carrier wherein reading services for the visually handicapped are contained. While such systems are widely used, they suffer from crosstalk with the main program channels, which degrades both the performance of the added subcarrier itself, as well as the quality of the stereophonic program channels. Because these prior art subcarriers must occupy the highest frequency regions of the baseband spectrum, they suffer disproportionately to their bandwidth from noise, due to the nature of the FM transmission system. Moreover, it is uneconomic to devote such additional subcarriers to relatively low-capacity applications.

Reliable signaling and slow-speed data transmission without adverse tradeoffs may be accomplished using the low-frequency band-edge of a stereophonic difference channel, as described in U.S. Pat. No. 4,388,493, which is incorporated herein by reference. This technique transmits one or more low-frequency signaling tones which are embedded in the stereo difference channel. Because of their low level and the ear's insensitivity to sounds at the frequency extremes, particularly low frequencies, such tones are not perceived by listeners with ordinary receivers, which are in any case relatively inefficient at reproducing the frequencies used. The stereo difference channel itself may be filtered to eliminate competing program energy from the region used to transmit the signaling tones. This filtering has no adverse effect on the stereo program because the absence of directional information at the frequency extremes, again particularly at low frequencies, is not discernable during stereo reproduction.

The technique summarized above works well for transmitting modest amounts of signaling or control information, for example the state of various signal-processing devices in use at the broadcasting station and the control of corresponding decoding devices in the receiver. Instead of simple tones, a modulated data signal whose spectrum is restricted to the low-frequency region below 200 Hz may be transmitted. The desirable features of the system include the absence of interference with the normal program, even in existing receivers which do not incorporate the invention, and the lack of compromise to the high-fidelity quality of the transmitted stereo program which accompanies the data or control transmission. For simple applications, such as control of indicator lamps or noise-reduction decoders in consumer receivers, a further advantage of this technique is that it may be implemented in very simple ways both in transmitter and receiver apparatus, often using accessories to existing equipment rather than requiring the redesign of such equipment.

In some circumstances it is desirable to extend the capabilities of a signaling transmission system such as the one described above while still avoiding the pitfalls of interference or compromise of program fidelity. In such cases, some of the simplicity of implementation of the system may be sacrificed in favor of increased capabilities. One known approach is to incorporate a so-called quadrature subchannel in addition to the normal stereo difference subchannel. The quadrature subchannel is created by modulating a subcarrier which differs in phase from the conventional subcarrier by ninety degrees, and is thus said to be in quadrature with the conventional subcarrier, which is called the in-phase subcarrier. The ordinary FM stereo receiver is designed to be insensitive to such a quadrature subchannel, and so in theory a signal may modulate such a quadrature subchannel without interfering with the conventional program. A decoder sensitive to the quadrature channel can recover the modulating signal in a special receiver.

Unfortunately, commonly encountered reception impairments, due to imperfections of the receiver itself as well as to unavoidable multipath interference experienced by the radio transmission, can result in substantial amounts of crosstalk between the quadrature subchannel and the in-phase subchannel. Because such crosstalk can be very audible in the normal stereo program, as well as corrupting the signal transmitted in the difference channel, the types of signals which may be transmitted in a quadrature subchannel are restricted.

One proposed prior art method uses a quadrature subchannel as an additional difference channel in a "compatible" quadraphonic transmission system. Compatible systems have as a design goal that a normal, unimpaired signal shall be received by listeners who are equipped with simple monophonic receivers, while listeners with progressively more elaborate equipment can receive a more fully-decoded signal that reveals additional features. The standard commercial stereo multiplex pilot-tone transmission system is of this type, as are known systems proposed for quadraphonic broadcasting.

More specifically, compatible multichannel transmission systems generally employ matrix combiners to derive a basic monophonic or sum signal, comprising the algebraic sum of left and right program channels, which is used to modulate directly the main RF carrier. Simple monophonic receivers detect only this sum. One or more difference signals are also derived, and are transmitted by means of additional subchannels which can be detected by appropriately equipped receivers. By recombining in a receiver matrix the sum and difference signals, two or more discrete channels of information can be recovered. The system is compatible because the loss of one or more of the difference channels, due to receiver design or other cause, does not result in loss of any crucial information beyond that which describes the spatial distribution of the audio signals among the channels. Even if the difference channel or channels is completely absent, the sum channel conveys the full frequency range of the audio program, comprising as it does all the individual audio channels added together.

With this approach, crosstalk between the subchannels appears in a receiver largely as errors of stereophonic imaging, rather than as unrelated interfering programs. The fact that the signals in all the various difference channels are highly correlated with the main program renders tolerable the inevitable crosstalk, both in standard stereo receivers unequipped for multichannel reception as well as in fully equipped quadraphonic receivers.

However, in the prior art the quadrature subchannel could not be employed in a satisfactorily compatible manner to transmit a largely uncorrelated program, for example a translation into a second language or a high-speed data signal, because the potential crosstalk between the in-phase and the quadrature subchannels would be unacceptable.

The present invention utilizes such a quadrature subchannel to transmit data or additional program information in a region of the spectrum such that crosstalk does not result in any substantial impairments either to ordinary receivers or to those equipped to decode the additional information. According to the present invention, the region of the quadrature subchannel used to transmit data or signaling information is chosen so that any crosstalk into the in-phase subchannel is inaudible due to the characteristics of human hearing and of normal receiver construction.

As described in U.S. Pat. No. 4,388,493, the difference channel or channels of a multichannel compatible matrix transmission system may be bandlimited to eliminate some group or groups of frequencies, with an effect limited to the extent of the directional information conveyed at those frequencies. The result of such bandlimiting is to reduce a stereo program, for example, to mono at the frequencies which have been eliminated in the difference channel. Research on the mechanisms of human hearing suggests that at certain regions of the spectrum, this "combining to mono" may be done without compromising the perceived stereo effect. Program audio may be removed from either the extreme low-frequency or high-frequency band-edges of the difference channel or channels, with no substantial loss of performance in existing receivers. Indeed, under some circumstances certain ancillary benefits result from such restriction, such as for example, substantially reducing the effects of turntable rumble and record warp, which appear primarily in the difference channel.

Eliminating program energy from the band-edges of the difference channel makes these portions of the spectrum available for data transmission by preventing interference of program energy with the data signals. The ear's insensitivity to the frequencies and levels employed for the data signals prevents such signals from interfering audibly with the program. Furthermore, low-frequency signals are very poorly reproduced by ordinary acoustic transducers, while high-frequency signals are significantly reduced in level in the conventional FM receiver by the standard high-frequency de-emphasis networks employed in such receivers, and by other shortcomings of such receivers.

In addition, a replica of the ordinary stereo difference channel which has been subjected to dynamic-range compression may be transmitted in the quadrature subchannel without causing unacceptable impairments due to crosstalk. Since the compressed and non-compressed versions of the stereo difference channel are highly correlated, crosstalk of either into the other is relatively acceptable. Moreover, because the compressed signal is highly immune to corruption by noise in the transmission channel, it may be transmitted at a reduced level, further reducing its interfering effect on the non-compressed program in the in-phase subchannel. Also, since the compressed difference-channel signal is intended to be symmetrically expanded by a complementary circuit in the receiver (compressor and expander comprising a compander noise reduction system), crosstalk from the in-phase subchannel into the companded quadrature subchannel is greatly reduced in the equipped receiver.

Therefore, a principal object of the present invention is to provide a signaling system that enables the transmission of signals, which may be data, control, or a program signal compressed in dynamic range, using a quadrature subchannel in addition to the conventional in-phase difference subchannel of the FM composite signal.

Another object of the present invention is to provide a signaling system which uses the broadcast spectrum with increased efficiency within the constraint that there be substantial compatibility with existing receivers.

A further object of the present invention is to provide a signaling system which provides flexible data communication capabilities without sacrificing broadcast features or causing interference.

A still further object of the present invention is to provide a signaling system that avoids audible interference in the main stereo composite signal caused by the data signals added to the quadrature subchannel by restricting the frequency range of the data signals to the extreme high- or low-frequency regions of the spectrum of this subchannel where both reproducer efficiency and auditory acuity are low.

A further object of the present invention is to provide a signaling system that prevents interference to the data signals contained in the quadrature subchannel caused by stereo separation signals in the stereo difference channel by restricting the energy at the band-edges of the difference channel using a low-frequency or high-frequency blend network, or both, which has the effect of restricting the stereo separation at those frequencies but which does not result in any significant audible impairment.

Another object of the present invention is to provide a signaling system that permits increased signaling capability by employing simultaneously the band-edges of the in-phase subchannel and the quadrature subchannel for data transmission.

Yet another object of the present invention is to provide a signaling system that provides a range of data transmission speeds and capacities.

These and other objects and advantages of the present invention will become more apparent upon reference to the accompanying drawings and following description, wherein.

Figure 1:
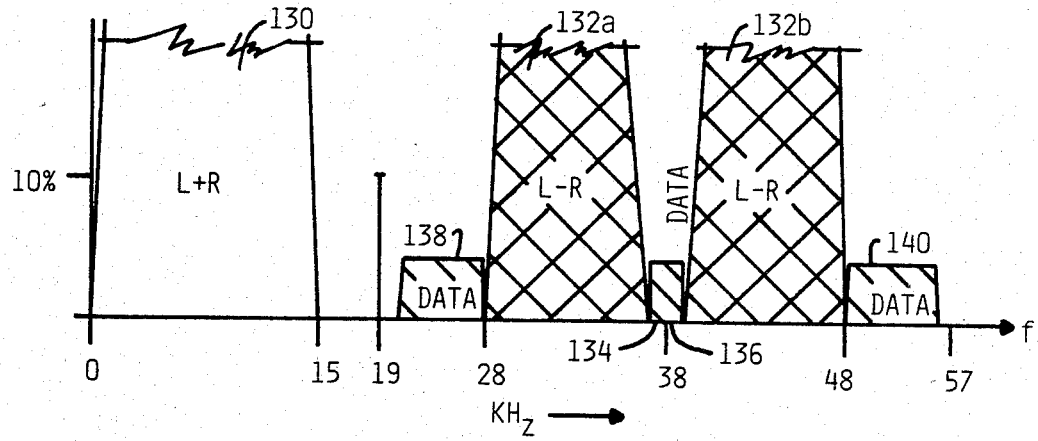
FIG. 1 illustrates a baseband frequency spectrum of a composite FM stereo signal modified for tone and data signaling according to the principles of the present invention.

Referring now to FIG. 1, there is shown a baseband frequency spectrum of a composite FM stereo signal developed in accordance with the method and apparatus of the present invention as hereinbelow described. The composite FM stereo signal includes a pilot carrier, shown at 19 kHz, which modulates the RF carrier at approximately 8-10% modulation. The L+R sum channel 130 is shown to occupy the lower 15 kHz of the baseband spectrum so as to be compatible with standard monophonic and stereophonic FM receivers. The L−R difference channel is formed about the 38 kHz subcarrier and conventionally occupies the band between about 23 kHz and 53 kHz.

Figure 2:
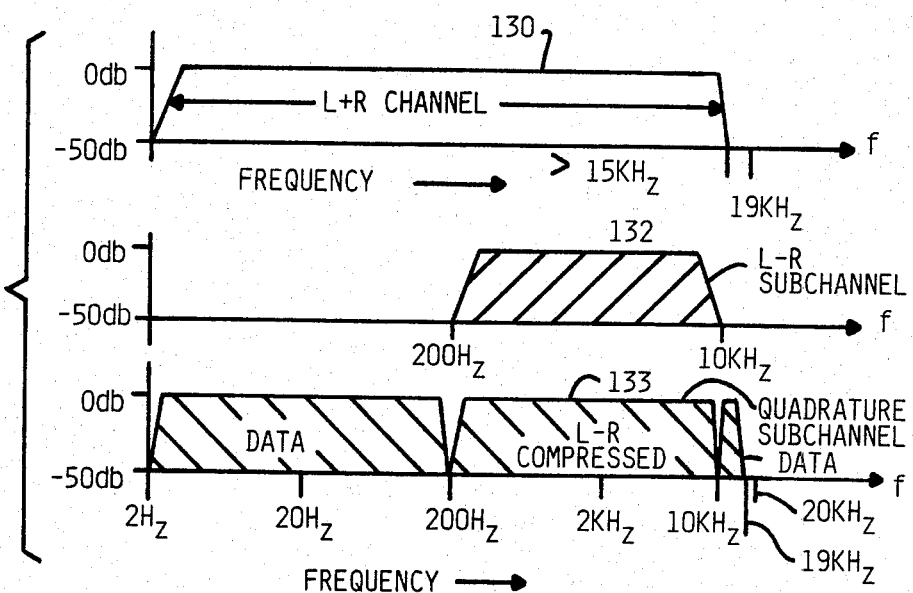
FIG. 2 is a frequency spectrum of each of the sum and difference channels of the composite FM stereo signal shown in FIG. 1.

Referring now to FIG. 2, the L+R sum channel 130 is shown to have a frequency spectrum that ranges from some arbitrarily low frequency, shown as 0 Hz, to 15 kHz. As is seen, the spectrum 130 of the sum channel rolls off in the vicinity of very low audio frequencies, below 50 Hz, and at very high audio frequencies at 15 kHz.

Also shown in FIG. 2, is an L−R difference subchannel 132 and a quadrature subchannel 133. Both of these subchannels are modulated on 38 kHz subcarriers which are shifted from one another by 90°, such that the quadrature subchannel is shifted by 90° from the in-phase L−R difference subchannel. For purposes of seeing how these two subchannels appear on the baseband spectrum illustrated in FIG. 1, the L−R subchannel 132 is shown with hatched lines along one direction while the quadrature subchannel 133 is shown with hatched lines in a second direction.

In a standard FM stereo signal, the L−R difference channel 132 may have a frequency spectrum of 0-15 kHz. However, according to the present invention, for purposes of suppressing interference in the quadrature subchannel caused by program material in the L−R subchannel, the spectrum 132 of the L−R difference channel is band limited, as best seen in FIG. 2, to exhibit sharp roll off characteristics at an exemplary low frequency cutoff of 200 Hz and at an exemplary high frequency cutoff of 10 kHz. These low and high frequency cutoffs of the difference channel are selected to minimize degradation of the stereo signal. The means for restricting the bandwidth of the difference channel may include known techniques of amplitude and phase correction to preserve accurate frequency response for the program as a whole. Using these cutoff frequencies, audible degradation is virtually imperceptible.

Referring again to FIG. 1, in the baseband spectrum, the difference channel, which modulates the suppressed subcarrier, occupies a lower sideband 132a between 28 and 37.8 kHz and an upper sideband 132b between 38.2 and 48 kHz. Within the baseband spectrum which is opened up by the high frequency band limiting of the difference channel, the present invention transmits data in quadrature at low levels of modulation in a first frequency spectrum 138 between 20-28 kHz and in a second frequency spectrum 140 between 48-56 kHz. Additional information in the quadrature subchannel can be added, as shown, in the lower and upper sidebands 132a and 132b. As described hereinbelow, this information may preferably include a quadraphonic difference channel, or a compressed L−R subchannel for use in a noise reduction system that does not require that it be substantially compatible with the normal stereo L−R subchannel because ordinary receivers are insensitive to the quadrature subchannel. As will become apparent from the following description, frequency spectrums 138 and 140 are summed into the composite FM stereo signal so as to be decoded as the outer part of the lower and upper sidebands, respectively, of the suppressed 38 kHz subcarrier. Similarly, the low frequency band limiting of the difference channel allows data to have a frequency spectrum 134 between 37.8-38 kHz and a frequency spectrum 136 between 38-38.2 kHz and also allows decoding as a separate inner part of the lower and upper sidebands, respectively, of the suppressed 38 kHz subcarrier. A feature of the present invention is that, because the levels of modulation are low and therefore that interference caused by data is minimized and audibly imperceptible, the frequency spectrum 138 may occupy a portion of the guard band as well as the higher frequencies of the usual difference channel.

Figure 3:
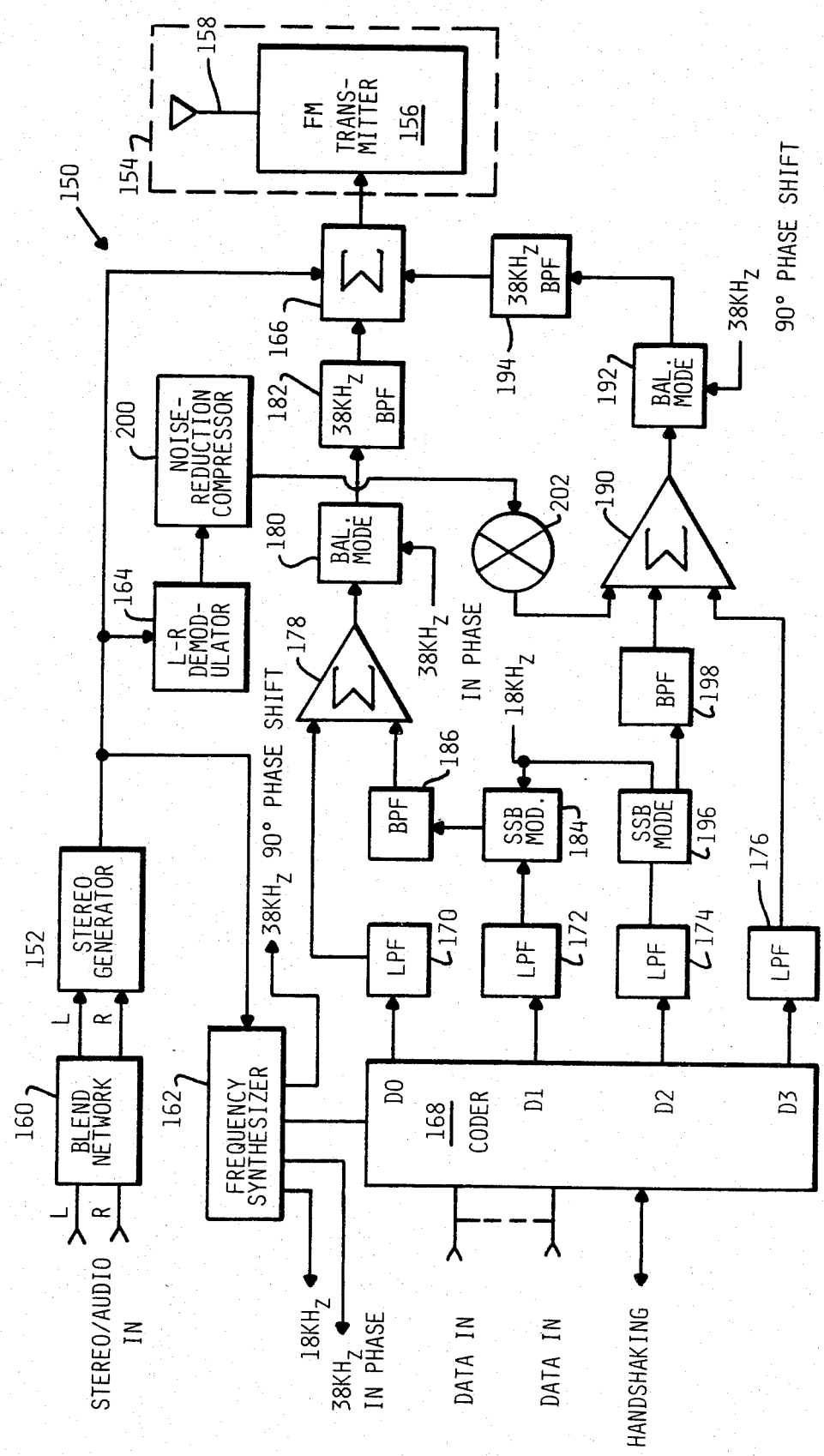
FIG. 3 is a schematic block diagram of an FM multiplex stereo transmission system including a signaling system which develops the baseband frequency spectrum of FIG. 1 according to the present invention.

Referring now to FIG. 3, there is shown a transmitting system 150 for developing the frequency spectrums illustrated in FIGS. 1 and 2. Transmitting system 150 includes a conventional stereo generator 152 which, in response to conventionally generated left and right channel signals L and R, develops a composite FM stereo signal. In the prior art the composite FM stereo signal is applied to an FM transmitting means 154 which includes a conventional FM transmitter 156 which frequency modulates the composite FM stereo signal onto an appropriate RF carrier signal, and an antenna 158 which radiates the modulated carrier signal, or a connection to a cable distribution system.

According to a preferred embodiment of the present invention, the conventionally generated left and right channel signals are first applied to a blend network 160 which blends to monophonic the left and right audio signals below 200 Hz and above 10 kHz, so that the resultant L−R difference channel developed by stereo generator 152 has the frequency spectrum 132 illustrated in FIG. 2 and occupies the lower and upper sidebands 132a and 132b seen in FIG. 1. The details of blend network 160 are hereinbelow described. After the conventionally generated left and right channels have their low and high frequency contents blended to monophonic, the blended left and right stereo signals are applied to stereo generator 152. The composite FM stereo signal output by generator 152, which includes the L+R sum channel, a 19 kHz pilot carrier, and the L−R difference channel, having the frequency spectrums illustrated in FIGS. 1 and 2, is applied to each one of a frequency synthesizer 162, an L−R demodulator 164, which demodulates the L−R difference channel, and a conventional summing network 166.

Frequency synthesizer 162 is responsive to and in phase-lock with the 19 kHz pilot carrier and, by conventional means, develops a sinusoidal signal which may have a frequency within 10 kHz–18 kHz and is exemplarily described as being 18 kHz hereinafter and a pair of 38 kHz sinusoidal signals. The first one of the pair of 38 kHz sinusoidal signals is developed with the same phase as the conventional 38 kHz suppressed subcarrier. The second one of the pair of 38 kHz sinusoidal signals is phase shifted by 90° with respect to the first one of the pair. Frequency synthesizer 162 further develops one or more clock or sync signals for application to a coder 168.

Coder 168, which is described in detail hereinbelow, consists of means for generating specific waveforms at each of its several outputs $D_0$–$D_3$, in response to a plurality of input data signals which are applied to its inputs. The exact correspondence between the input data signals and the resulting coded output signals is arbitrary and depends specifically on the details of coder 168. For example, coder 168 may develop one or more tones at each one of its outputs. The frequency of such tone may be unique to the input in response to which it is developed. Of course, as hereinbelow described, coder 168 also may develop suitably encoded analog waveforms at one or more of its outputs in response to data received on one or more of the coder 168 data input lines. When coder 168 encodes digital data, the maximum transmission rate of the distinct analog waveforms which represent such data is determined by the bandwidth of the spectrum in which such representative symbol waveforms will be transmitted, as is well known in the art. The clock and sync signals developed by frequency synthesizer 162 are selected to be commensurate with the data transmission rate of both the incoming data signals applied to coder 168 and the output data signals developed by coder 168. An additional output of coder 168 may be provided to provide handshaking or control communication in conjunction with I/O functions of a suitable data processing system.

Each output $D_0$–$D_3$ of coder 168 is coupled to an associated one of a plurality of low pass filters 170–176. Each low pass filter 170–176 is selected to have a cutoff frequency commensurate with the frequency spectrum of the encoded data signal developed by coder 168 at its associated output $D_0$–$D_3$, to eliminate any spurious frequencies or harmonics outside of the required frequency spectrum, and thereby to eliminate or minimizing crosstalk between the various channels of the baseband spectrum illustrated in FIG. 1.

The output of low pass filter 170 is coupled to a first input of a summing amplifier 178. Momentarily disregarding the signal applied to the other input of summing amplifier 178, which is hereinbelow described, a component of the output signal of summing amplifier 178 which corresponds to the output of low pass filter 170 is applied to a balanced modulator 180. Balanced modulator 180 amplitude modulates the component of the modulating signal developed by low pass filter 170 onto the in-phase 38 kHz sinusoidal signal developed by frequency synthesizer 162. If low pass filter 170 has an exemplary cutoff frequency of 200 Hz, the modulated signal developed by balanced modulator 180 will have an upper and lower sideband which are band limited to 38 kHz ±200 Hz. The modulated signal is applied to a 38 kHz band pass filter 182 which is selected to have upper and lower cutoff frequencies to eliminate spurious frequency components below the data spectrum 138 and above the data spectrum 140 in the baseband. After the modulated signal is applied to band pass filter 182, the filtered modulated signal is applied to an input of summing network 166. The data, developed at the $D_0$ output of coder 168, after being filtered and modulated as above described, now occupies a frequency spectrum of +38 kHz ±200 Hz. This spectrum is summed into the composite FM stereo signal by summing network 166 as lower and upper sidebands 134 and 136, which are best seen in FIG. 1, centered about the 38 kHz suppressed subcarrier. Because the modulated 38 kHz sinusoidal signal is in-phase with the 19 kHz pilot carrier, the lower and upper sidebands 134 and 136 may be demodulated in an appropriate receiver and appear as if they had directly modulated the 38 kHz suppressed subcarrier by means of conventional stereo generator 152.

The data developed at the $D_1$ output of coder 168 is applied to low pass filter 172. The output of low pass filter 172 is coupled to a modulator, shown in exemplary form as a single sideband modulator 184. Single sideband modulator 184 is set up to only develop the lower sideband of the modulated signal. The in-phase 18 kHz sinusoidal signal developed by frequency synthesizer 162 is also applied to single sideband modulator 184. The 18 kHz sinusoidal signal is amplitude modulated in modulator 184 by the filtered data that is output by low pass filter 172. This modulated signal is applied to a band pass filter 186 which has lower and upper cutoff frequencies commensurate with the frequency spectrum of the lower sideband. The output of band pass filter 186 is coupled to the other input of summing amplifier 178 to apply the lower sideband thereto.

Low pass filter 172 may have an exemplary cutoff frequency of 8 kHz. The frequency spectrum of the lower sideband developed by single sideband modulator 184 would then be between 10 kHz and 18 kHz. The component of the lower sideband developed at the output of summing amplifier 178 is also applied to balanced modulator 180. This lower sideband component amplitude modulates the 38 kHz sinusoidal signal, the modulated signal being applied to band pass filter 182 as hereinabove described. When the modulated lower sideband component is summed with the composite FM stereo signal by summing network 166, it is summed into the baseband frequency spectrum, shown in FIG. 1, as data spectrum 138 and data spectrum 140 and appears as a lower sideband between about 20 and 28 kHz and an upper sideband between about 48 and 56 kHz of the 38 kHz suppressed subcarrier as hereinabove described.

Thus it is seen that single sideband modulator 184 shifts the frequency spectrum of the data developed at the $D_1$ output of coder 168 so that when modulating the 38 kHz sinusoidal signal the resulting sidebands will occupy the region of the outer edges of the L−R difference channel. It should also be noted that the preferred embodiment of the present invention also utilizes a portion in the baseband spectrum known as the guard band, although this is not necessary.

Low pass filter 176 coupled to the $D_3$ output of coder 168 provides a function similar to low pass filter 170. The output of low pass filter 176 is coupled to a first input of a summing amplifier 190. The output of amplifier 190 is coupled to a balanced modulator 192. Balanced modulator 192 has applied to it the 38 kHz signal which is phase shifted 90° with respect to the in-phase 38 kHz signal. Thus, the component of the output of summing amplifier 190 developed by low pass filter 176 modulates the 90° phase shifted 38 kHz signal and applies the modulated signal to a 38 kHz band pass filter 194. Band pass filter 194 provides a similar function as described with reference to band pass filter 182. The modulated and filtered signal developed by band pass filter 194 is then applied to summing network 166. It is to be noted that the output of band pass filter 194 when combined by summing network 166 occupies the frequency spectrum in the composite FM stereo signal as described with reference to the output of low pass filter 170. However, the component of the output of summing amplifier 190 developed by low pass filter 176 is modulated in a quadrature relationship with the similar component developed by summing amplifier 178. In this respect, additional data may be transmitted in this spectrum to fully utilize the FM stereo baseband spectrum.

Similarly, low pass filter 174 has coupled to it the $D_2$ output of coder 168, a data signal having a frequency spectrum similar to the data signal developed by the $D_1$ output of coder 168. The spectrum of this data signal, when filtered by filter 174, is shifted in frequency by single sideband modulator 196, and the spurious frequency components are removed by band pass filter 198. Similarly, as described with reference to single sideband modulator 184, modulator 196 develops only the lower sideband of the modulated signal. This lower sideband is applied to a second input of summing amplifier 190 for modulating the quadrature related 38 kHz signal. The lower sideband component developed by modulator 196 and bandpass filter 198 occupies the same frequency spectrum at the outer frequency edges of the L−R difference channel as described hereinabove with reference to modulator 184.

Thus, the transmitting system 150 may utilize the frequency spectrum by providing simultaneous tone and data transmissions. Outputs $D_0$ and $D_3$ of coder 168, since limited to a bandwidth of 200 Hz, would be useful for developing a signaling tone, as described in reference to the system disclosed in U.S. Pat. No. 4,388,493. Outputs $D_1$ and $D_2$, because of their larger bandwidth of up to 8 kHz, may be useful for transmitting digital data, with such data being quadrature modulated by a pair of 38 kHz carriers to increase the density of the data transmitted. However, outputs $D_0$ and $D_3$ may likewise be used for digital data at a slower rate. The 18 kHz sinusoidal signal applied to each of single sideband modulators 184 and 196 is merely an exemplary frequency. A 10 kHz signal, or any frequency derived from the pilot carrier between 10 and 18 kHz, may used for this modulated signal. Note that if 10 kHz is used, single sideband modulators 184 and 196 could be set up to only develop an upper sideband, so that the frequency spectrum occupied by the sideband signals in the composite FM stereo signal generated at summer 166 would be the same as hereinabove described. Moreover, any known modulation technique may be used to emplace the baseband data signals $D_1$ or $D_2$ in the upper regions of the subchannel spectrums, as described.

In a preferred embodiment of the present invention, the composite FM stereo signal is also demodulated by a demodulator 164 to develop the L−R difference signal. This difference signal is applied to a noise reduction compressor 200. Compressor 200 may be any noise reduction compressor known in the art, such as the commercially available noise reduction compressor offered under the trademark Dolby. Generally, noise reduction compressor 200 may be of the conventional signal controlled compander type. The compressed signal output by compressor 200 is applied to a third input of summing amplifier 190 through a switch 202 to provide selection of a companded signal to be added to the FM stereo baseband signal. Furthermore, the activated or non-activated state of switch 202 may be used to control a signaling tone transmitted according to the present invention, which tone may in turn be used to control a corresponding noise reduction expander in a receiver, as explained herein below. The companded signal is also modulated on the quadrature 38 kHz sinusoidal signal. The utility of providing the companded signal by means of a noise reduction compressor 200 and of placing this signal on the quadrature subchannel will be more fully described hereinbelow.

Figure 4:
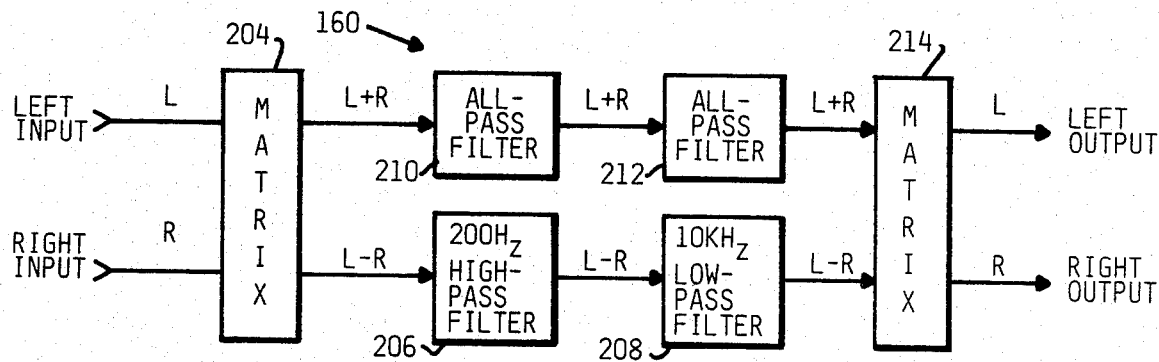
FIG. 4 illustrates a schematic block diagram of a blend circuit shown in FIG. 3.

Referring now to FIG. 4, there is shown a preferred embodiment of blend network 160 illustrated in FIG. 3. Blend network 160 includes a first matrix combiner 204 which, in response to the conventionally developed left and right channel signals, develops the L+R sum signal and the L−R difference signal. The L−R difference signal is first applied to a high pass filter 206, and after such high pass filtering, is then applied to a low pass filter 208. High pass filter 206 preferably has a cutoff frequency of 200 Hz and low pass filter 208 preferably has a cutoff frequency of 10 kHz. The result is a L−R difference signal that has a frequency spectrum of between 200 Hz and 10 kHz, as illustrated in FIG. 2. The L+R sum signal is applied through a first all pass filter 210 and then a second all pass filter 212 to provide a phase response for the sum signal that is commensurate with the phase response of the difference signals after having been coupled through high pass filter 206 and low pass filter 208. This enables a proper phase relationship to be maintained between these two signals. The filtered sum and difference signals are then applied to a matrix decoder 214 to develop left and right channel signals for application to stereo generator 152. The left and right channel signals developed by matrix decoder 214 have their low frequency audio signals below 200 Hz and the high frequency audio signals above 10 kHz blended to monophonic.

Figure 5:
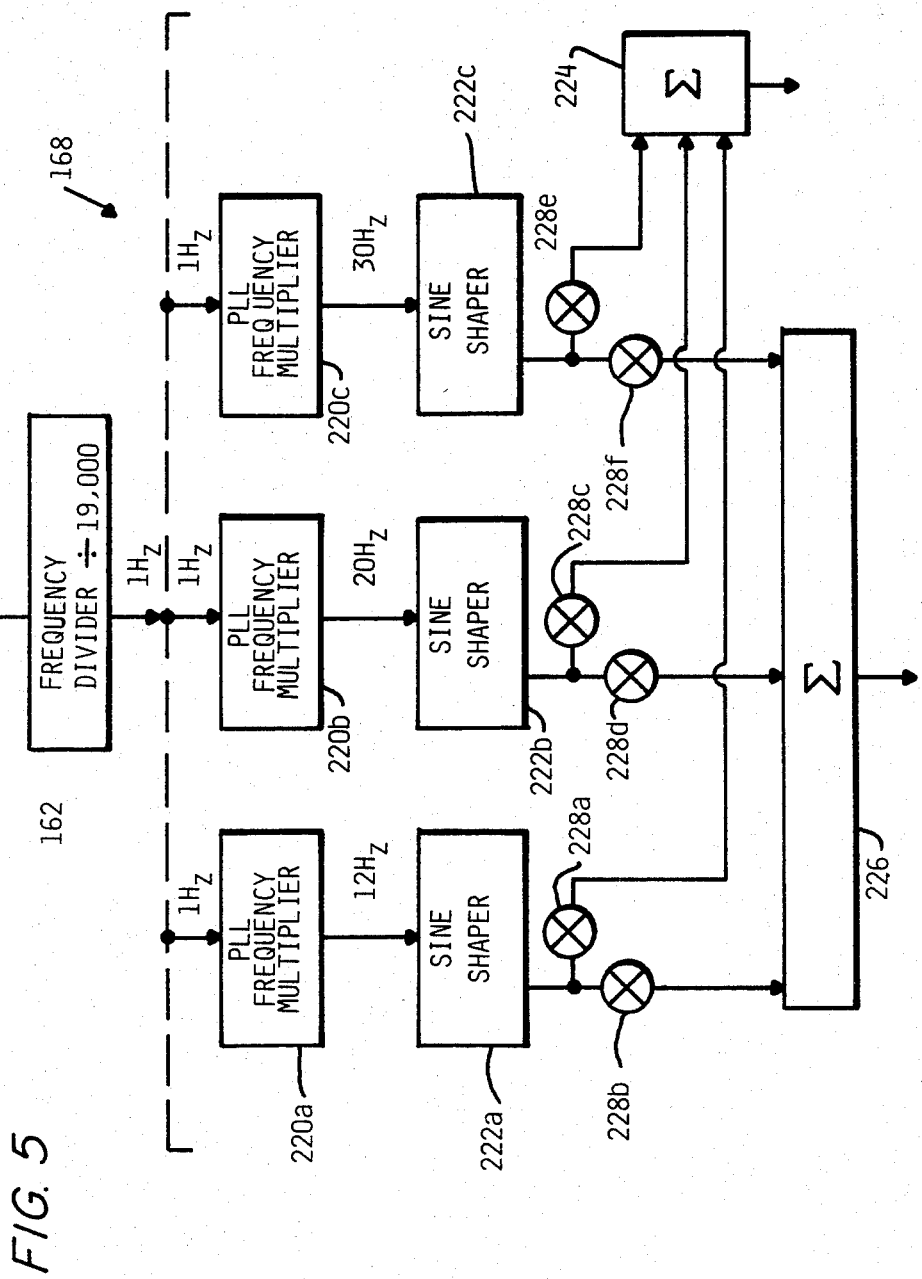
FIG. 5 is a schematic block diagram of a simple coder illustrating one embodiment of the coder shown in FIG. 3.

Referring now to FIG. 5, there is shown one embodiment of coder 168 according to the principles of the present invention. In this embodiment of coder 168, frequency synthesizer 162 includes a divider that develops an output waveform having a frequency of 1 Hz. This output waveform is input to coder 168 and is applied to one or more phase lock loop frequency multipliers, shown herein as frequency multipliers 220a, 220b and 220c. Each frequency multiplier provides a different output waveform at a frequency unique to each such multiplier. For example, frequency multiplier 220a is exemplary shown to develop an output signal at 12 Hz, frequency multiplier 220b an output signal at 20 Hz and frequency multipler 220c an output signal at 30 Hz. Associated with each frequency multiplier 220a–220c, is a waveform shaper 222a–222c, respectively. Each waveform shaper 222a–222c shapes the output waveform of the associated frequency multiplier so that such waveform is substantially sinusoidal. Each of these sinusoidal waveforms, which are low frequency tones, are selectively switched to one of a first summing element 224 or a second summing element 226 by means of a plurality of switches 228a–228f. Switches 228a–228f, are arranged in pairs, each pair associated with one of waveform shapers 222a–222c. The state of each switch 228a–228f is controlled by the state of the data input lines to coder 168. For example, one data input line may be associated with each switch 228a–228f, and a digital "one" on any such data line will close the switch associated therewith. The output of summing element 224 may exemplary be shown as output $D_0$ of coder 168 (FIG. 3) and the output of summing element 226 be shown as the output $D_3$ of coder 168. It is to be understood that any number of summing elements may be used to develop further outputs of coder 168.

Coder 168 may also accept input digital data and encode such data as multilevel amplitude shift keyed output data at its outputs $D_0$–$D_3$ and transmit such digital data using techniques of the present invention as hereinabove described. For example, data may be accepted in packets of four bits, and be assigned a particular combination of pairs of output voltage amplitudes chosen from the set $V_1$, $V_2$, $-V_1$, $-V_2$, one of the pair chosen from the set modulating the in-phase 38 kHz sinusoidal signal and the other modulating the quadrature 38 kHz sinusoidal signal, as hereinabove described. Thus, sixteen unique combinations of four amplitudes taken two at a time are possible, which correspond to all the possible combinations of the four binary bits of input data. The signaling rate, or baud rate, may be 75 Hz when the data is transmitted in the low frequency region defined by data spectrums 134 and 136 or as high as 1200 Hz, 2400 Hz, or higher, if the data is translated upward to the high frequency band edge, by single sideband modulators 184 and 196, to thereby occupy data spectrums 138 and 140. The clock which determines the signaling rate may be derived by synthesizer 162.

Figure 6:
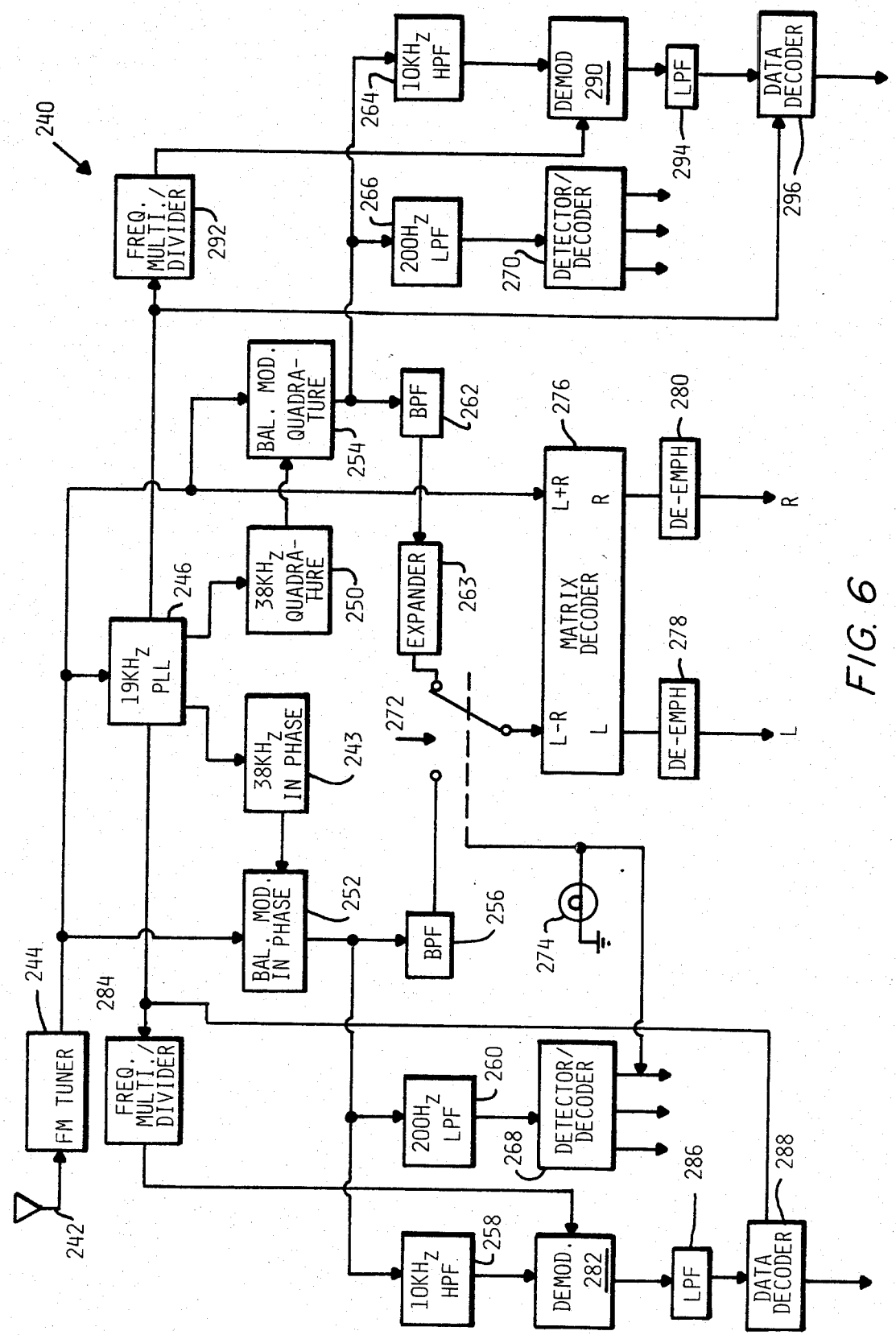
FIG. 6 is a schematic block diagram of an FM stereo receiver for receiving and detecting tone and/or data signals developed by the transmission system of FIG. 3.

Referring to FIG. 6, there is shown a preferred embodiment of a receiving system 240 according to the principles of the present invention. Receiving system 240 receives the RF carrier modulated by the system of FIG. 3 at an antenna 242 and applies the resultant electrical signal to a standard FM tuner 244. Tuner 244 demodulates the RF carrier and develops the composite baseband FM stereo signal. The baseband signal developed by tuner 244 is applied to a 19 kHz phase lock loop 246 which, in response to the 19 kHz pilot carrier, develops a 19 kHz reference signal in-phase with the pilot carrier. This 19 kHz signal is applied to a first frequency multiplier 248 which develops a 38 kHz reference signal in-phase with the 19 kHz reference signal, i.e., the conventional "in-phase" stereo subcarrier, and to a second frequency multiplier 250 which develops a second 38 kHz reference signal in quadrature relationship with the first 38 kHz reference signal. The in-phase 38 kHz reference signal is applied to a first balanced demodulator 252, and the quadrature 38 kHz reference signal is applied to a second balanced demodulator 254. The baseband signal is also applied to each of balanced demodulator 252 and balanced demodulator 254. Balanced demodulator 252 then demodulates the data and difference channel spectrums which were modulated on the 38 kHz in-phase subcarrier. Similarly, balanced demodulator 254 demodulates the data and difference channel spectrums which were modulated on the quadrature 38 kHz subcarrier.

The demodulated signal developed by balanced demodulator 252 is applied to a band pass filter 256. Band pass filter 256 has a lower cutoff frequency of 200 Hz and a upper cutoff frequency of 10 kHz and therefore passes the frequency spectrum 132 of the L−R difference channel.

The demodulated signal developed by demodulator 252 is also applied to a high pass filter 258 and a low pass filter 260. High pass filter 258 has a cutoff frequency of 10 kHz and therefore passes the still modulated data (modulated by modulator 184 of FIG. 3) contained in the frequency spectrums 138 and 140 of FIG. 6. Low pass filter 260 has a cutoff frequency of 200 Hz and therefore passes the data of the frequency spectrums 134 and 136 of FIG. 1.

Similarly, balanced demodulator 254 applies the demodulated signal derived from the quadrature 38 kHz carrier to a band pass filter 262, high pass filter 264 and a low pass filter 266. Band pass filter 262 has a lower cutoff frequency of 200 Hz and an upper cutoff frequency of 10 kHz and passes the difference channel that had been processed by noise reduction compressor 200 (FIG. 3) and modulated on the quadrature carrier. High pass filter 264 has an upper cutoff frequency of 10 kHz and passes the still modulated data (modulated by modulator 196 of FIG. 3) contained in frequency spectrums 138 and 140 of FIG. 1. Low pass filter 266 has a cutoff frequency of 200 Hz and passes the data spectrum of the quadrature carrier similarly as described with reference to low pass filter 260.

The signal passed by low pass filter 260 is applied to a detector/decoder 268 and the signal passed by low pass filter 266 is applied to a detector/decoder 270. Detector/decoders 268 and 270 may be of a type as disclosed in U.S. Pat. No. 4,388,493, especially when data spectrums 134 and 136 are used for in-band tone signaling. If fixed tones are used, as hereinabove described with reference to FIG. 5, detector/decoders 268 and 270 may be of a type that is synchronously clocked by a signal derived from the 19 kHz reference developed by 246. One such signaling tone may indicate that a noise reduction system is being utilized by the broadcaster, and a signal developed on an appropriate output line of detector/decoder 268 or 270 may be used to activate a switch 272 for selecting either the difference channel of the in-phase subcarrier or the companded difference channel of the quadrature subcarrier. When noise reduction circuitry is being used, such a control line may also energize an indicating lamp 274 located on the front panel of a receiver.

The sum channel of the composite baseband signal and the selected one of the difference channels of the in-phase subcarrier or the companded difference channel of the quadrature subcarrier are applied to a matrix decoder 276 of conventional design. Matrix decoder 276 develops the left and right channels L and R of the audio stereo program. The left and right channel signals developed by matrix decoder 276 are applied to conventional de-emphasis networks 278 and 280, respectively, prior to being applied to the amplifier and speakers of the receiver. These de-emphasis networks roll off high frequencies in the L and R channels so as to complement the pre-emphasis conventionally used in stereo encoders.

The signal passed by high pass filter 258 is applied to a demodulator 282 to recover the data signal which was encoded in the lower sideband of the 18 kHz reference signal as described above. A frequency multiplier/divider 284 is responsive to the 19 kHz reference developed by phase lock loop 246 for developing a reference signal to be applied to demodulator 282 at the same frequency of the modulated signal applied to single sideband modulator 184 (FIG. 3). The demodulated signal is applied to a low pass filter 286 to remove spurious spectral components above 8 kHz. The filtered signal is then applied to a suitable data decoder 288 which accurately reconstructs the data developed at the $D_1$ output of coder 168 (FIG. 3). The 19 kHz reference signal developed by phase lock loop 246 may be utilized to derive a signal to clock this data as such data had initially been clocked by coder 168. Of course any other clocking frequency may be conventionally developed.

Similarly, the data contained in frequency spectrums 138 and 140 (FIG. 1) which modulated the quadrature 38 kHz reference signal is similarly decoded by a demodulator 290, frequency multiplier/divider 292, low pass filter 294 and data decoder 296, each of these providing an analogous function to the similar elements described for decoding these data spectrums which modulated the in-phase 38 kHz signal.

Figure 7:
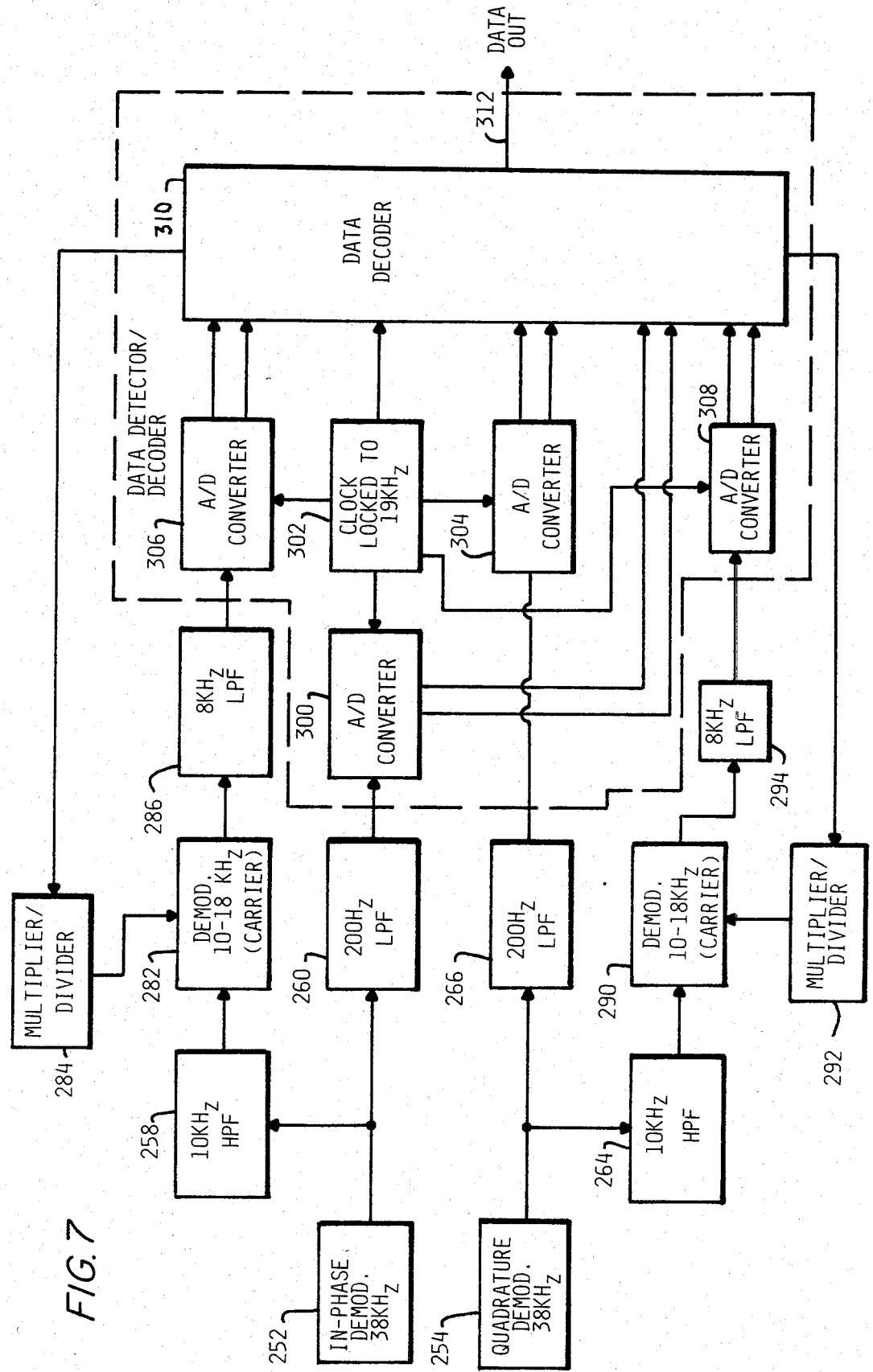
FIG. 7 is a schematic block diagram of a decoder shown in FIG. 6.

Referring now to FIG. 7, there is shown one embodiment of a data detector/decoder shown in FIG. 6. The low frequency data after being demodulated and low pass filtered is applied to a first analog to digital converter 300. The converter is clocked by a clock signal developed by clock 302. The clock signal is phase locked to the 19 kHz reference signal. Similarly, the low frequency data which modulated the quadrature 38 kHz reference signal after low pass filtering is applied to an analog to digital converter 304 also clocked by clock 302. The filtered high frequency data developed by low pass filter 286 is applied to analog to digital converter 306 for the high frequency data which modulated the in-phase 38 kHz reference signal. The filtered high frequency data developed by low pass filter 294 is applied to analog to digital converter 308 for the high frequency data on the quadrature 38 kHz carrier. The digital data from each of analog digital converters 300, 304, 306 and 308 is applied to a suitable data decoder 310. Data decoder 310 may preferably be any general purpose microprocessor programmed in accordance with the encoding scheme of coder 168 (FIG. 3). Data decoder 310 may develop the output data either in serial or in parallel form along an output line 312. Furthermore, decoder 310 may develop a correction signal which causes the reconstructed subcarriers used by single sideband demodulators 282 and 290 to assume the optimum phase relationship for data recovery.

Although the preferred embodiment of the present invention contemplates that the middle portion of the quadrature subchannel is either left unused or contains a compressed difference channel, it had been proposed that the quadrature subchannel be used as a separate difference channel for the front and rear part of a compatible quadraphonic transmission system. In such a system, data signals may be placed in this quadrature difference channel by use of an analogous matrix combiner technique as taught in U.S. Pat. No. 4,388,493. In such a system, data signals with appropriate polarity would be allocated among the four program channels which are output by a four channel blend network which would be employed in such a system. The sum of all such components would be zero, such that no data signal would appear in the main or sum channel, while the data signal would appear entirely in the respective quadraphonic difference subchannels, either the L−R subchannel or the front minus back subchannel, with the latter being modulated on the quadrature subcarrier.

Furthermore, although the exemplary stereo multiplex system hereindescribed uses a 19 kHz pilot subcarrier and suppressed subcarriers at 38 kHz, it will be understood that the present invention applies equally well to similar transmission methods which use other frequencies or additional subcarriers. Examples of the latter would include those known or proposed for multichannel television ground transmission or multiplex transmission systems where such systems are employed with terrestrial or satellite communications links.

It is therefore of course understood that although the preferred embodiments of the present invention have been illustrated and described above, various other modifications, alternatives and equivalents thereof will become apparent to those skilled in the art and, accordingly, the scope of the present invention should be defined only by the appended claims and equivalents thereof.

What is claimed is:

1. In a stereo transmission system for generating and transmitting an FM multiplex signal derived from left and right audio frequency stereo channels, said multiplex signal including a sum channel containing the summed left and right stereo channel signals and a difference channel containing the difference between said left and right stereo channel signals, said difference channel being modulated on a first subcarrier, a signaling system comprising:
   means for developing at least one quadrature subcarrier in said FM multiplex signal and for modulating said quadrature subcarrier with at least one selected signal to develop information carrying sidebands of said quadrature subcarrier;
   means for substantially minimizing degradation of each of said sum channel and said difference channel by said sidebands.

2. The signaling system of claim 1 wherein said minimizing means includes means for inserting said sidebands at the band edges of said difference channel.

3. The signaling system of claim 1 wherein said quadrature subcarrier has the same frequency as said first subcarrier.

4. The signaling system of claim 1 wherein said minimizing means includes means for inserting said sidebands at the band edges of said difference channel in the event said sidebands contain signaling tones or data, and for inserting said sidebands within the same frequency occupied by said difference channel in the event said sidebands contain audio program material.

5. The signaling system of claim 4 wherein said minimizing means further includes means for band limiting said difference channel at at least one of a preselected low cutoff frequency and a preselected high cutoff frequency, said sidebands containing data or signaling tones being adjacent each said cutoff frequency and outside the freqeuncy range of said difference channel.

6. The signaling system of claim 5 wherein said sideband containing audio program material is band limited commensurately with said difference channel, said program material being noise compressed audio programming derived from said difference channel.

7. The signaling system of claim 6 further including:
means for modulating said first subcarrier by further selected signals to develop further information carrying sidebands at the band edges of said difference channel.

8. The signaling system of claim 5 wherein said band limiting means includes means for reducing to monophonic said left and right stereo channels below said low cutoff frequency and above said high cutoff frequency.

9. In a stereo transmission system for generating and transmitting an FM multiplex signal derived from left and right audio frequency stereo channels, said multiplex signal including a sum channel containing the summed left and right stereo channel signals and a first difference channel containing the difference between said left and right stereo channel signals, said sum channel directly frequency modulating an RE carrier, said first difference channel being modulated on a first 38 kHz subcarrier, a signaling system comprising:
means for developing at least one quadrature 38 kHz subcarrier in said FM multiplex signal and for modulating said 38 kHz quadrature subcarrier with at least one selected data signal to develop information carrying sidebands of said 38 kHz quadrature subcarrier;
said sidebands selectively occupying the frequency spectrum of said FM multiplex signal below 200 Hz and above 10 kHz.

10. The signaling system of claim 9 which further includes:
noise reduction means for developing a second difference channel from said left and right audio frequency stereo channels, said second difference channel including noise reduction signals;
means for band limiting said second difference channel between 200 Hz and 10 kHz;
said second difference channel modulating said quadrature subcarrier to develop further sidebands containing said second difference channel, said further sidebands being inserted in the same frequency band occupied by said first difference channel.

11. The signaling system of claim 9 which further includes:
means for developing a digital data signal having a frequency spectrum less than 6 kHz; and
means for producing a frequency shifted signal comprising translating said frequency spectrum of said data signal to have a minimum frequency of at least 10 kHz;
said frequency shifted signal being modulated onto said quadrature subcarrier to develop a sideband at the upper cutoff frequency of said first difference channel.

* * * * *